United States Patent Office

3,235,623
Patented Feb. 15, 1966

3,235,623
POLYPROPYLENE HEAT STABILIZED WITH INTERPOLYAMIDE
Jean Hacquard and Maurice Alliot-Lugaz, Lyon, France, assignors to Societe Rhodiaceta, Paris, France, a French body corporate
No Drawing. Filed Sept. 14, 1961, Ser. No. 137,983
Claims priority, application France, Jan. 2, 1961, 848,603
6 Claims. (Cl. 260—857)

This invention relates to compositions having a basis of polypropylene, especially isotactic polypropylene, and to their use in the production of filamentary materials.

It has been known for some years to prepare by polymerisation of propylene under relatively low pressures and in the presence of stereospecific catalysts polymers of high crystallinity which are capable of forming shaped bodies having good mechanical properties. These crystalline polypropylenes may be melt-extruded in the form of monofilaments and multifilament yarns suitable for use in the textile field. However, such filamentary materials have the disadvantage that they lose a great amount of their strength when they are kept at a high temperature.

The present invention provides compositions of improved thermal stability, which compositions comprise a high proportion of polypropylene, especially polypropylene having a high degree of isotacticity, and a smaller proportion of an interpolyamide obtainable by polycondensation of hexamethylenediammonium adipate and hexamethylenediammonium sebacate. (While it is usual in making polyamides of this general type to start with the corresponding salt or salts, it will be understood that the invention is not limited to any particular method of making the interpolyamide, but only to its nature.) Such an interpolyamide contains residues of the formulae —NH(CH$_2$)$_6$NH—, —CO(CH$_2$)$_4$CO—, and

—CO(CH$_2$)$_8$CO—

Proportions of the interpolyamides of between 5% and 15% by weight (calculated on the total weight) are sufficient to impart satisfactory thermal stability to the composition and articles made therefrom, even over a long period, and are preferred.

Preferably an interpolyamide is employed whose constituents, i.e., units derived respectively from hexamethylenediammonium adipate and sebacate, are in a ratio by weight between 30:70 and 50:50.

The polypropylene and the interpolyamide may be mixed by crushing and malaxating at elevated temperature, for example in a screw extruder or a malaxator of the type known under the name "Ko-Malaxeur Buss." It is not necessary, as in the case of mixtures of simple polyamides and polypropylene, to use high pressures, above 500 pounds per square inch, in the course of the malaxation.

The interpolyamides give, with the polypropylene, fine, homogeneous dispersions which can easily be spun and give filaments which can be stretched without particular difficulty by known methods. Such fine dispersions are very difficult to obtain in practice with simple polyamides.

The improvement of the thermal stability of polypropylene by the addition of an interpolyamide is especially surprising because polypropylene seems to catalyse the oxidation of polyamides, since if polypropylene filaments and polyamide filaments are left in contact in an oven at 110° C., it is found that the polyamide filaments are more degraded and more oxidised by the air at the points of contact with the polypropylene than elsewhere.

Not all interpolyamides have this stabilising action on polypropylene. Comparative tests carried out on filaments obtained from mixtures based upon interpolyamides from hexamethylenediammonium adipate/caprolactam and hexamethylenediammonium adipate/caprolactam/hexamethylenediammonium sebacate, show that the strength of these filaments decreases almost as rapidly as that of filaments consisting of pure polypropylene when they are maintained at an elevated temperature.

Another advantage of the compositions of the invention in the production of filamentary materials is that filaments and fibres formed therefrom can be dyed with satisfactory results by the usual dyeing methods employing high temperatures and can be given certain finishing treatments for which a high temperature is required, without any substantial reduction in their tensile strength. Moreover, it has been observed that the fastness of dyes on these materials is very good.

The following examples illustrate the invention without limiting it. "Parts" are by weight.

*Example I*

10 parts of an interpolyamide obtained by polymerising a mixture of 45 parts of hexamethylenediammonium adipate and 55 parts of hexamethylenediammonium sebacate are added to 90 parts of isotactic polypropylene and the mixture is homogenised in a "Ko-Malaxeur Buss" malaxator at 220° C. and thereafter brought into the form of a strip, which is then granulated.

This granular composition is extruded through a spineret having 46 holes at 295° C., and at a speed of 600 meters per minute. After solidification, the multifilament yarn formed is stretched by 3 times its length while passing over a plate at 130° C. and a finger at 80° C. The product is a 320 denier 46 filament yarn having a tenacity of 2.79 grams per denier and an elongation of 44.6%.

A sample of this yarn when kept in an oven at 110° C., for 16 days, retains its tenacity while a yarn consisting of pure polypropylene, having a comparable count and subjected to the same conditions, is almost entirely degraded at the end of 6 days.

*Example II*

There are mixed in a malaxator (Ko-Malaxeur Buss) at 220° C. 90 parts of isotactic polypropylene and 10 parts of an interpolyamide containing 30% by weight of hexamethylenediammonium adipate units and 70% by weight of hexamethylenediammonium sebacate units.

This composition is extruded at 295° C. and the resulting yarn is hot-stretched, to give a 224 denier, 46 filament yarn of tenacity 3.37 grams per denier and elongation 39%.

A sample of this yarn is kept in an oven at 110° C. together with a yarn of comparable count consisting of pure polypropylene. At the end of 5 days, the pure polypropylene yarn has suffered a tenacity loss of 50%. It is necessary to wait 11 days for the polypropylene-interpolyamide yarn to show the same loss.

*Example III*

There is prepared from a composition identical to that of Example I, a 320 denier 46 filament yarn having a tenacity of 4.37 grams per denier. This yarn is dyed at 100° C. in a bath containing 3% by weight of "Bleu pur acetoquinone-lumière" (manufactured by Compagnie Francaise de Matières Colorantes). The dyed yarn has a tenacity of 4.09 grams per denier. After exposure for 10 days to 110° C. in an oven, the yarn still has a tenacity of 3.99 grams per denier, while a yarn consisting of pure polypropylene having the same count and subjected to the same conditions disintegrates into dust.

We claim:
1. Polypropylene compositions useful for the production of filaments of improved thermal stability, comprising crystalline polypropylene and an interpolyamide con- sisting essentially of structural units of the formulae —NH(CH$_2$)$_6$NH—, —CO(CH$_2$)$_4$CO— and

—CO(CH$_2$)$_8$CO— the interpolyamide constituting 5 to 15% of the combined weight of the two polymers.

2. Polypropylene compositions useful for the production of filaments of improved thermal stability, comprising crystalline polypropylene malaxated with an interpolyamide consisting essentially of structural units of the formulae —NH(CH$_2$)$_6$NHCO(CH$_2$)$_4$CO— and

—NH(CH$_2$)$_6$NHCO(CH$_2$)$_8$CO— in a weight ratio between 30:70 and 50:50, the interpolyamide constituting 5 to 15% of the combined weight of the two polymers.

3. Process for the production of polypropylene-based filaments of improved thermal stability, which comprises melt-spinning a blend of crystalline polypropylene and an interpolyamide consisting essentially of structural units of the formulae —NH(CH$_2$)$_6$NH—, —CO(CH$_2$)$_4$CO— and —CO(CH$_2$)$_8$CO—, the interpolyamide constituting 5 to 15% of the combined weight of the two polymers.

4. Process for the production of polypropylene-based filaments of improved thermal stability, which comprises melt-spinning a malaxated blend of crystalline polypropylene and an interpolyamide consisting essentially of structural units of the formulae

—NH(CH$_2$)$_6$NHCO(CH$_2$)$_4$CO— and —NH(CH$_2$)$_6$NHCO(CH$_2$)$_8$CO— in a weight ratio between 30:70 and 50:50, the interpolyamide constituting 5 to 15% of the combined weight of the two polymers, and thereafter stretching the filaments so produced.

5. Filamentary materials made of a blend of crystalline polypropylene and an interpolyamide consisting essentially of structural units of the formulae —NH(CH$_2$)$_6$NH—, —CO(CH$_2$)$_4$CO— and —CO(CH$_2$)$_8$CO—, the interpolyamide constituting 5 to 15% of the combined weight of the two polymers.

6. Oriented filamentary materials made of a blend of crystalline polypropylene and an interpolyamide consisting essentially of structural units of the formulae

—NH(CH$_2$)$_6$NHCO(CH$_2$)$_4$CO— and —NH(CH$_2$)$_6$NHCO(CH$_2$)$_8$CO— in a weight ratio between 30:70 and 50:50, the interpolyamide constituting 5 to 15% of the combined weight of the two polymers.

References Cited by the Examiner

UNITED STATES PATENTS

| | | | |
|---|---|---|---|
| 2,249,686 | 7/1941 | Dykstra | 260—857 |
| 2,302,332 | 11/1942 | Leekley | 117—161 |
| 2,906,123 | 9/1956 | Vernet et al. | 260—896 |
| 2,993,028 | 7/1961 | Renalli | 260—897 |
| 3,093,255 | 6/1963 | Mesrobian et al. | 260—857 |
| 3,097,181 | 7/1963 | Glickman et al. | 260—857 |
| 3,107,228 | 10/1963 | Cappuccio et al. | 260—857 |
| 3,112,159 | 11/1963 | Cappuccio et al. | 8—55 |

FOREIGN PATENTS

| | | |
|---|---|---|
| 461,237 | 2/1937 | Great Britain. |
| 535,070 | 3/1941 | Great Britain. |
| 598,310 | 5/1960 | Canada. |

OTHER REFERENCES

Kresser, "Polypropylene," 1960, New York, Reinhold Publishing Corp., pages 1–3.

MURRAY TILLMAN, *Primary Examiner.*

L. J. BERCOVITZ, W. H. SHORT, *Examiners.*